United States Statutory Invention Registration [19]

[11] Reg. Number: H391

Henriquez et al. [43] Published: Dec. 1, 1987

[54] PIEZOELECTRIC POLYMER HYDROPHONE

[75] Inventors: Theodore A. Henriquez; Allan C. Tims, both of Orlando, Fla.

[73] Assignee: The United States of America as represented by the Secretary of the Navy, Washington, D.C.

[21] Appl. No.: 877,708

[22] Filed: Jun. 23, 1986

Related U.S. Application Data

[63] Continuation of Ser. No. 526,252, Aug. 25, 1983, abandoned.

[51] Int. Cl.[4] ..... H04R 17/00

[52] U.S. Cl. ..... 367/159; 310/337; 310/800; 367/167; 367/169; 367/172

[58] Field of Search ..... 367/15–20, 367/152–155, 157, 159, 162, 163, 165–167, 169, 171–174, 176, 177, 180–188; 310/337, 340, 345, 800, 369

[56] References Cited

U.S. PATENT DOCUMENTS

| | | | |
|---|---|---|---|
| 3,027,540 | 3/1962 | Howatt | 367/159 |
| 3,249,913 | 5/1966 | Smyth et al. | 367/159 |
| 3,262,093 | 7/1966 | Junger et al. | 367/159 |
| 3,375,489 | 3/1968 | Kompanek | 367/167 |
| 3,480,907 | 11/1969 | King | 367/159 |
| 3,775,737 | 11/1973 | Laurent | 367/159 |
| 3,781,778 | 12/1973 | Sawin et al. | 367/152 |
| 3,885,286 | 5/1975 | Hill | 367/20 X |
| 4,063,215 | 12/1977 | Abbott | 367/166 |
| 4,162,476 | 7/1979 | Fanning | 367/155 |
| 4,178,577 | 12/1979 | Cini et al. | 367/159 |
| 4,183,010 | 1/1980 | Miller | 367/154 |
| 4,486,869 | 12/1984 | Carter | 367/154 |

FOREIGN PATENT DOCUMENTS

| | | | |
|---|---|---|---|
| 1798485 | 8/1978 | Fed. Rep. of Germany | 367/167 |

OTHER PUBLICATIONS

Yoram Berlinsky, "Transduction with $PVF_2$ in the Ocean Environment", NRL Report 8365, Mar. 28, 1980.

*Primary Examiner*—Deborah L. Kyle
*Assistant Examiner*—John E. Griffiths
*Attorney, Agent, or Firm*—Kenneth W. Hairston; Robert W. Adams

[57] ABSTRACT

A hydrophone comprising a tubular thin-walled member of a piezoelectric polymer such as polyvinylidene with electrodes covering the interior and exterior surfaces of the tubular member. An elastomeric core is inserted into the interior of the tubular member and then brought into radial compression against the interior surface of the tubular member.

1 Claim, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PIEZOELECTRIC POLYMER HYDROPHONE

This application is a continuation of application Ser. No. 526,252, filed Aug. 25, 1983, now abandoned.

BACKGROUND

1. Field of the Invention

The field of the invention is generally hydrophones and in particular is neutral density, shock-resistant hydrophones.

2. Description of the Prior Art

A hydrophone is an underwater transducer for converting underwater acoustic signals to electrical signals. Although hydrophones can generally be used as sound generators as well as detectors, this application will primarily discuss hydrophones for underwater sound detection.

Most underwater acoustic detectors have been designed using a sensor element of a piezoelectric ceramic such as lead-zirconate, lead-titanate or barium-titanate. The piezoelectric characteristics of these materials provide for the conversion of acoustic energy to electrical energy through the compression of the piezoelectric material. Although the above mentioned materials are efficient for the acoustic-electrical conversion, they suffer from several problems.

These ceramic materials are brittle and cannot sustain large tensile strains without breaking. This fragility presents severe problems when the hydrophone is expected to survive the explosive shock pressures associated with submarine warfare or seismic exploration. Several methods have been used to prestress ceramic sensors in order to decrease the possibility of tensile failure of the ceramic. Representative methods are wrapping the sensor with fiber glass and using stress rods to keep the sensor material in compression even at the highest tensile loads. However all these methods tend to degrade the acoustic performance of the hydrophone.

Another disadvantage inherent in ceramic hydrophones arises from the density of the piezoelectric ceramic. The density of ceramics is typically in the range of 7.0 to $7.7\times10^3$ kg/m$^3$ compared to a density of water near $1\times10^3$ kg/m$^3$. Note that the density of water varies a few percent dependent upon temperature and salinity. This mismatch of densities presents design problems in constructing neutrally buoyant hydrophones.

A further disadvantage of ceramic sensors arises from the high velocity of sound in the ceramic and the high mechanical Q of ceramic. Because of these properties, ceramic sensors are generally unsuitable for broadband, high-frequency applications.

SUMMARY OF THE INVENTION

Accordingly, one object of the invention is to provide a shock resistant hydrophone.

Another object of the invention is to provide a hydrophone using a piezoelectric sensor element with a density approximating that of water.

Yet a further object of this invention is to provide a hydrophone capable of broadband, high frequency operation.

The invention is a hydrophone using a piezoelectric polymer such as polyvinylidene flouride as the sensing element. The piezoelectric polymer is formed into a thin wall tube with deposited electrodes on the interior and exterior surfaces. An elastomer core fills the interior of the tube and provides radial compression against the interior of the tube.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
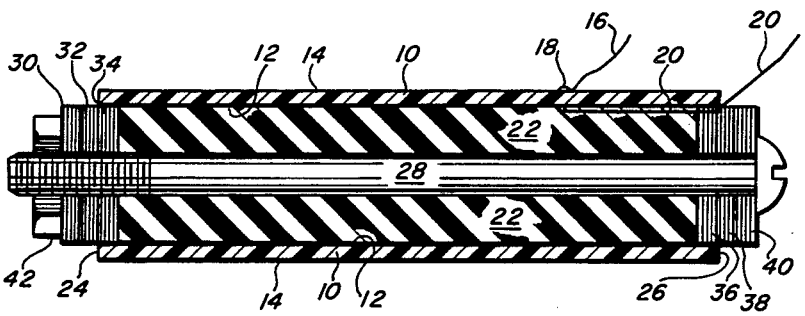
FIG. 1 is a cross-sectional view of a first embodiment of the invention.

Thick-film polymers have recently been found capable of being formed into a material having piezoelectric properties. One such polymer is polyvinylidene flouride, often referred to as PVDF or $PVF_2$.

This material needs to be processed to produce its piezoelectric characteristics. One such method is described by Berlinsky in "Transduction with $PVF_2$ in the Ocean Environment", NRL Report 8365, Mar. 28, 1980, herein incorporated by reference. Referring now to the drawings, wherein like reference numerals designate identical or corresponding parts throughout the several views, and more particularly to FIG. 1 thereof, PVDF can be used to form a unique and advantageous sensor assembly. A hollow cylinder or tube 10 of PVDF is the piezoelectric element. The tubular cylinder of PVDF can be obtained from Thorn EMI Laboratories of Great Britain and such a sample is voided, i.e. contains voids, because of the high speed of elongation used in its fabrication. In one experimental model the outside diameter of the tube is 1.2 cm with a wall thickness of 0.05 cm. The interior surface of the tube 10 is substantially covered by an interior electrode 12 of copper. Similarly an exterior electrode 14 of copper covers the exterior surface of the tube 10. The copper electrodes 12 and 14 can be deposited by electro-deposition, by electroless deposition or a combination thereof. An exterior electrode wire 16 is bonded to the exterior electrode 14 by patch of silver conducting epoxy 18. A gold foil strip 20 is placed next to the interior electrode 12. Compression to be described later provides good electrical contact between the foil 20 and the interior electrode 12. An elastomeric core 22 of for instance neoprene is included within the interior of the tube 10 and is of a diameter to form a slip fit with the interior electrode 12 and gold foil strip 20. Other elastomers can be used for the core 22 but for best results its Shore A hardness should not exceed 90 durometer. In its uncompressed state the elastomer core 22 is longer than the tube 10 and extends beyond the ends 24 and 26 of the tube when the core 22 is centered.

The elastomer core 22 has a central coaxial through passage to accept a screw 28. The dimensional tolerances of the passage are such that the screw 28 is slip fit to the passage. Multiple nylon compression washers 30, 32, 34, 36, 38 and 40 are placed at both ends of the elastomer core 22 and the screw fits through all of the washers 30–40. The outside diameter of the washers 30–40 is slightly less than the inside diameter of the tube 10.

A compression nut 42 is fit to the threaded end of the screw 28. When the nut 42 is screwed onto the screw it serves to longitudinally compress the elastomer core 22 thus expanding and compressing the core 22 against the interior surface of the tube 10. The radial compression produces circumferential strain in the PVDF tube 10. It has been found that the sensitivity of PVDF for the piezoelectric effect is markedly increased when the PVDF is under strain. The compression of the core 22 against the tube 10 also prevents the inclusion of air at the core-tube interface. Furthermore the stiffened core improves the broadband frequency response of the hydrophone by damping acoustic modes within the cavity of the tube 10. An end view of the assembly of FIG. 1 is shown in FIG. 2.

Figure 2:
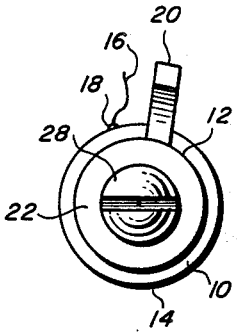
FIG. 2 is an end view at a right angle to that of FIG. 1 of the first embodiment of the invention.

The assembly shown is FIG. 1 is placed in an elastomer boot of neoprene which is filled with castor oil. The boot which is not shown is a thin wall flexible tube which serves to protect the hydrophone assembly from the marine environment. Alternatively the assembly can be encapsulated by an elastomer bonded to the assembly. It has been found that all traces of air must be eliminated in the hydrophone assembly. The different parts of the assembly must be coated with a film of castor oil before assembly and the assembly must be filled under a vacuum with degassed castor oil.

Figure 3:
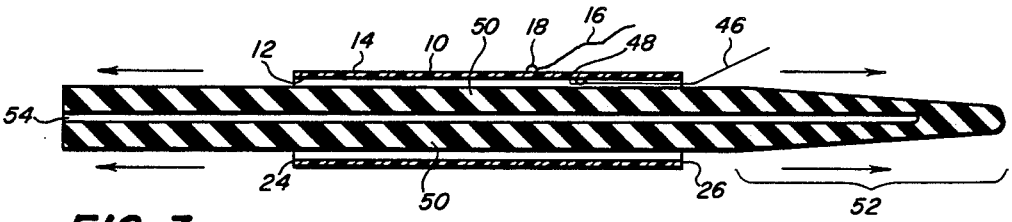
FIG. 3 is a cross-sectional view of a second embodiment invention during its fabrication.
Figure 4:
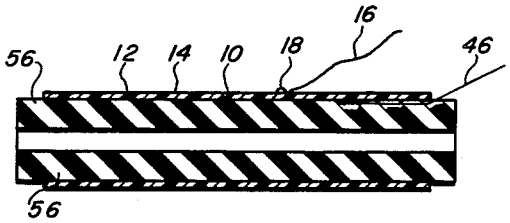
FIG. 4 is a cross-sectional view of the second embodiment after a substantial completion of its fabrication.

In a second embodiment shown in FIG. 3 no compression screw is required to provide the radial expansion of the elastomer core. The PVDF tube 10, the interior and exterior electrodes 12 and 14, and the exterior electrode wire 16 are similar to the corresponding parts in the embodiment of FIG. 1. The gold foil is replaced in this example by an interior electrode wire 46 and a second patch of conducting silver epoxy 48. An elastomer core is formed from an elastomer core stock 50 of cylindrical shape with an unstressed outside diameter along its central portion somewhat larger than the interior diameter of the tube. The core stock 50 is substantially longer than the tube 10 with one end 52 tapered so that the end 52 can be easily fit through the tube 10. The core stock 50 also has a coaxial through-passage 54 that allows the core stock to stretch linearly and maintain a uniform diameter over it central portion when stretched. The tapered end 52 is passed through the tube 10 and then the core stock 50 is axially tensioned or stretched so that its central portion is reduced in diamenter to pass through the tube 10. With the core stock 50 stretched its central portion is positioned within the tube 10. Thereafter the tension on the core stock 50 is relaxed so that the core stock 50 contracts axially and expands radially to compress the interior surface of the tube 10 and to impress a slight circumferential strain on the tube 10. The excess core stock beyond the ends 24 and 26 of the tube is then removed to leave a core 56 shown in FIG. 4 in compression against the tube 10.

A hydrophone built according to this invention has been found to be highly resistant to shock without elaborate prestressing methods. The PVDF sensor described here is more sensitive to acoustic signals than the equivalent volume of a piezoceramic material. Because the density of PVDF is very close to that of water, a PVDF hydrophone with an elastomer core manifests almost neutral buoyancy which is very desirable in towed acoustic arrays. The invention as described here requires no precision machined parts and so can be assembled in large quantities at low cost. The materials from which the example hydrophones are built are very nearly acoustically transparent in water and so are not affected by acoustic diffraction and reflection. Because PVDF exhibits a very low mechanical quality factor or Q, a PVDF hydrophone has good broadband response. The hydrophone may be operated well above the fundamental resonance of the configuration without large excursions in response.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A hydrophone, comprising:

a tube of outside diameter of approximately 1.2 cm comprising piezoelectric polyvinylidene, the wall thickness of which is substantially 0.05 cm;

an electrode of copper metal deposited on the exterior surface of said tube;

an electrode of copper metal deposited on the interior surface of said tube;

an elastomeric core with a central axial passage fitted within said tube, which core is composed of neoprene with Shore A hardness not exceeding 90 durometer; and means for axially compressing said core to cause radial compression of said core against said tube.

* * * * *